(12) United States Patent
Ponstein

(10) Patent No.: US 11,772,445 B2
(45) Date of Patent: Oct. 3, 2023

(54) CONSTRUCTION MACHINE, PARTICULARLY ROAD MILLING MACHINE, AND METHOD FOR CONTROLLING THE STROKE POSITION OF A PISTON-CYLINDER UNIT OF A LIFTING COLUMN OF A CONSTRUCTION MACHINE

(71) Applicant: BOMAG GMBH, Boppard (DE)

(72) Inventor: Joachim Ponstein, Boppard (DE)

(73) Assignee: BOMAG GMBH, Boppard (DE)

( * ) Notice: Subject to any disclaimer, the term of this patent is extended or adjusted under 35 U.S.C. 154(b) by 115 days.

(21) Appl. No.: 17/309,839

(22) PCT Filed: Dec. 17, 2019

(86) PCT No.: PCT/EP2019/000342
§ 371 (c)(1),
(2) Date: Jun. 23, 2021

(87) PCT Pub. No.: WO2020/135921
PCT Pub. Date: Jul. 2, 2020

(65) Prior Publication Data
US 2022/0072922 A1    Mar. 10, 2022

(30) Foreign Application Priority Data

Dec. 28, 2018 (DE) .................... 10 2018 010 153.4

(51) Int. Cl.
*B60G 17/015* (2006.01)
*E01C 23/088* (2006.01)
*E01C 23/12* (2006.01)

(52) U.S. Cl.
CPC ...... *B60G 17/015* (2013.01); *B60G 2202/413* (2013.01); *B60G 2300/09* (2013.01);
(Continued)

(58) Field of Classification Search
CPC .................................................. B60G 17/015
See application file for complete search history.

(56) References Cited

U.S. PATENT DOCUMENTS

| 4,861,066 A | * | 8/1989 | Dernie | B60G 21/06 280/5.508 |
| 9,523,176 B2 | * | 12/2016 | Berning | G01B 5/18 |

(Continued)

FOREIGN PATENT DOCUMENTS

| DE | 10256278 | 6/2004 |
| DE | 10337600 | 3/2005 |

(Continued)

OTHER PUBLICATIONS

International Search Report from corresponding PCT Appln. No. PCT/EP2019/000342, dated Mar. 31, 2020.
(Continued)

*Primary Examiner* — Paul N Dickson
*Assistant Examiner* — Shams Dhanani
(74) *Attorney, Agent, or Firm* — Grossman, Tucker, Perreault & Pfleger, PLLC

(57) ABSTRACT

A construction machine, in particular a road milling machine, comprising a machine frame, a traveling mechanism with front and rear traveling devices with at least one pair of front traveling devices and/or one pair of rear traveling devices, at least one pair of the front or rear traveling devices being connected to the machine frame via lifting columns each having a hydraulically adjustable piston-cylinder unit, a drive device for driving the hydraulically adjustable piston-cylinder unit of the lifting columns separately from one another, and a control device configured to control the lifting adjustment of the lifting columns by means of the hydraulically adjustable piston-cylinder units, and to a method for controlling the lifting position of a piston-cylinder unit of a lifting column of a construction
(Continued)

machine, in particular a construction machine according to the invention.

17 Claims, 3 Drawing Sheets

(52) U.S. Cl.
CPC .... *B60G 2400/252* (2013.01); *B60G 2500/30* (2013.01); *B60G 2800/914* (2013.01); *E01C 23/088* (2013.01); *E01C 23/127* (2013.01)

(56) References Cited

U.S. PATENT DOCUMENTS

| | | | |
|---|---|---|---|
| 2003/0084719 A1 | 5/2003 | Wiklund et al. | |
| 2005/0050886 A1 | 3/2005 | Bauer et al. | |
| 2005/0207841 A1 | 9/2005 | Holl et al. | |
| 2008/0100017 A1 | 5/2008 | Bitter | |
| 2008/0152428 A1 | 6/2008 | Berning et al. | |
| 2010/0109422 A1 | 5/2010 | Busley et al. | |
| 2011/0298188 A1 | 12/2011 | Haubrich et al. | |
| 2014/0379227 A1 | 12/2014 | Reuter et al. | |
| 2016/0177522 A1 | 6/2016 | Nacke et al. | |
| 2017/0362784 A1* | 12/2017 | Hoffmann | E01C 23/127 |
| 2018/0170462 A1* | 6/2018 | Barimani | B60G 17/005 |
| 2019/0176559 A1* | 6/2019 | Bittner | B60G 17/0165 |
| 2022/0048352 A1* | 2/2022 | Busley | B60G 3/01 |

FOREIGN PATENT DOCUMENTS

| | | |
|---|---|---|
| DE | 102005044211 | 3/2007 |
| DE | 102006051894 | 5/2008 |
| DE | 102006062129 | 7/2008 |
| DE | 102010050441 | 10/2011 |
| DE | 102014019168 | 6/2016 |
| DE | 102017005814 | 12/2017 |
| WO | 03/064770 | 8/2003 |

OTHER PUBLICATIONS

International Preliminary Report on Patentability from corresponding PCT Appln. No. PCT/EP2019/000342, dated Jun. 16, 2021.
First Office Action from related Chinese Appln. No 201980086944.6 dated Apr. 15, 2022. English translation attached.

* cited by examiner

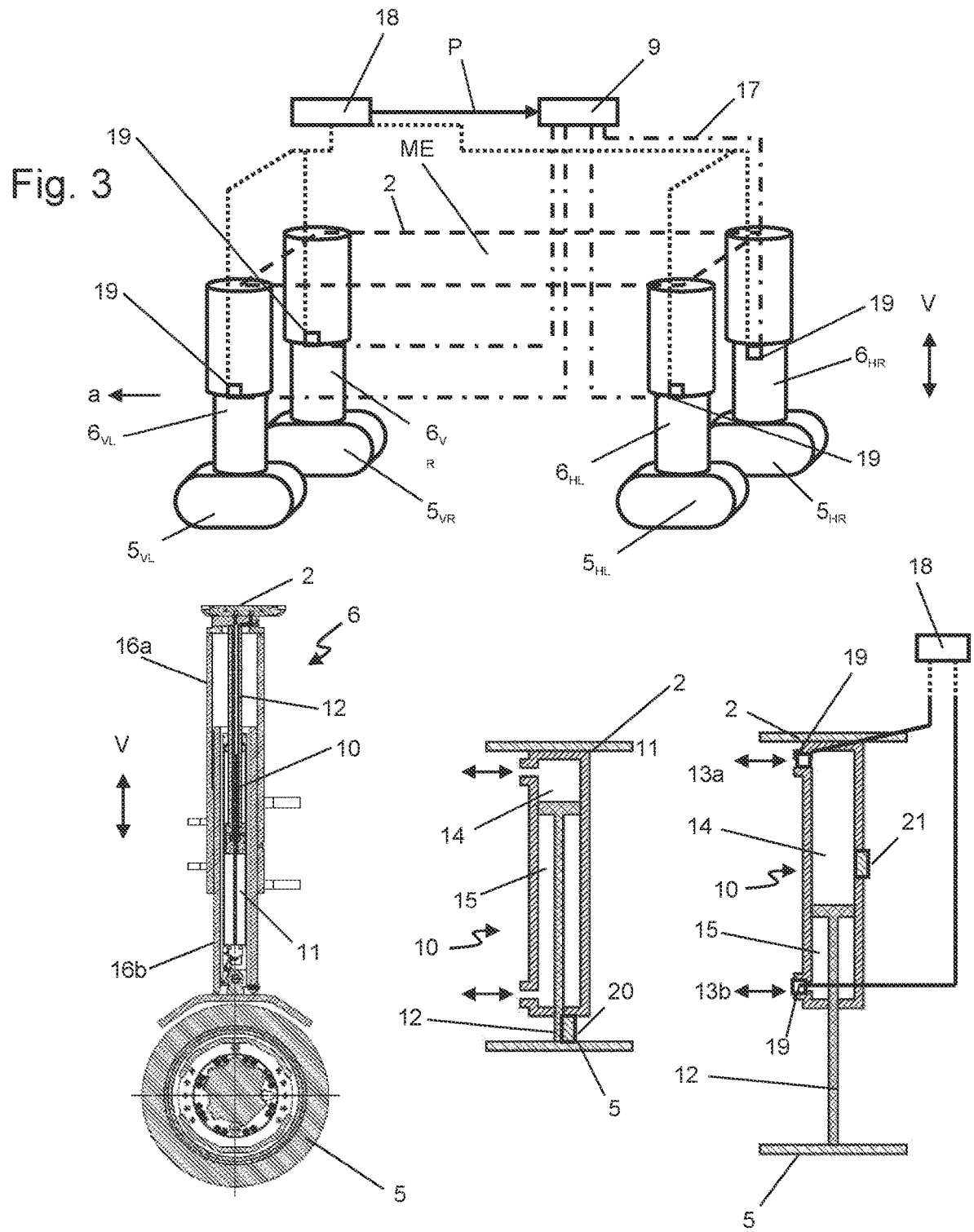

CONSTRUCTION MACHINE, PARTICULARLY ROAD MILLING MACHINE, AND METHOD FOR CONTROLLING THE STROKE POSITION OF A PISTON-CYLINDER UNIT OF A LIFTING COLUMN OF A CONSTRUCTION MACHINE

FIELD

The invention relates to a construction machine, in particular a road milling machine, and a method for controlling the lifting position of a piston-cylinder unit of a lifting column of a construction machine

BACKGROUND

Generic construction machines, in particular ground milling machines, are known, for example, from DE 10 2006 062 129 A1, DE 10 2005 044 211 A1, DE103 37 600 A1 and WO 03/064770 A1. Such ground milling machines are used for milling the underlying ground, for example for milling road surfaces and/or for stabilization and/or recycling measures on the underlying ground, and for this purpose have a milling device with a milling drum which is mounted horizontally with its rotation axis transverse to the working direction and which, in rotating working operation, mills the underlying ground using corresponding working tools arranged on the outer jacket surface of the milling drum. In addition to the milling device, such a ground milling machine further comprises a machine frame, which constitutes the essential support structure of the construction machine Further, front and rear traveling devices are arranged on the machine frame, usually comprising at least one pair of front traveling devices and/or one pair of rear traveling devices, traveling devices in this case meaning both wheels and crawler tracks. However, a single pair of the traveling devices may generally also be replaced by a single traveling device in a known manner. The traveling devices may be connected to the machine frame via height-adjustable lifting columns, so that the machine frame is variable in height relative to the underlying ground. Such lifting columns may each comprise a piston-cylinder unit. Further, there is usually a drive device for driving the hydraulically adjustable piston-cylinder units of the lifting columns separately from one another. Such a drive device is in particular a hydraulic pump or hydraulic system.

In order to enable different height positioning of the machine frame relative to the underlying ground, at least one pair of the front and/or rear traveling devices is connected to the machine frame via lifting columns with a respective piston-cylinder unit. The lifting columns are configured such that they can vary the distance between the machine frame and the traveling device, in particular at least partially in vertical direction, in order to effect a lifting adjustment in vertical direction of the machine frame relative to the underlying ground. The piston-cylinder units are linear actuators and are specially arranged such that they allow linear adjustment in vertical direction. Further, generic construction machines comprise a control device configured to control the lifting adjustment of the lifting columns by the piston-cylinder units. One task of the control device is to adjust the piston-cylinder unit such that the lifting column, and thus the entire machine, assumes a desired lifting position, for example in order to be able to adjust the height adjustment of the construction machine itself on the one hand and the position of the machine frame relative to the underlying ground on the other hand into positions adapted to the existing operating conditions. Such a construction machine is described in DE102014019168A1, which is herewith incorporated by reference. Specifically, the control device may, for example, actuate suitable valves that control the inflow and outflow of hydraulic fluid to the piston-cylinder unit.

A particular challenge, especially in the case of generic ground milling machines, is on the one hand the realization of a uniform work result, for example with respect to the milling depth, and on the other hand the guarantee of tip stability of the ground milling machine in order to enable safe working and transport operation. This is particularly problematic on uneven ground or when driving over obstacles, such as when driving over a milling edge. Due to the relatively high center of gravity of these construction machines, they have a comparatively high tendency to tip even when the machine reaches slight inclinations. When operating such a machine, it is therefore desirable on the one hand to know the lifting position of at least one and in particular of all lifting columns and on the other hand to be able to selectively move to specific lifting positions.

In this regard, systems with travel measuring systems that can be coupled to the elements that are adjustable relative to each other are already known in the prior art. These systems directly measure an actuation travel or a specific relative position. However, some of these systems are comparatively expensive and complex to install, maintain and repair.

SUMMARY

The object of the invention is therefore to provide an improved way of determining and monitoring the lifting position of a lifting column of a generic construction machine The object is achieved with a construction machine, in particular road milling machine, and a method according to the independent claims. Preferred embodiments are cited in the dependent claims.

In a generic construction machine, in particular road milling machine, according to the invention, at least one piston-cylinder unit of a pair of the front or rear or right or left traveling devices is assigned a measuring device which is configured to measure and monitor a change of a volume of a reference fluid which correlates with the current lifting position of the piston-cylinder unit. The invention is thus based on the finding that, on the one hand, there is a dependency relationship between the receiving volume, in particular of the piston-cylinder unit, and the current lifting position of the lifting column If, for example, the piston side receiving space of the piston-cylinder unit is assumed for the hydraulic fluid, it increases, for example, as the piston-cylinder unit moves apart and thus the lifting position increases, and vice versa. The opposite can be the case for the piston rod side receiving space. Since the hydraulic fluid receiving spaces of conventional piston-cylinder units are usually spaces, in particular cylindrical (piston side) or hollow-cylindrical or annular (piston rod side) spaces, the dimensions of which are constant with respect to their extension in radial direction relative to the longitudinal axis of the actuation axis and thus vary solely as a function of the current actuating position along the actuation axis, tracking the filling volume can reliably provide indirect information on the absolute height position of the piston-cylinder unit, and measuring and monitoring a change in volume can reliably provide at least information on the relative change in the height position of the piston-cylinder unit. Ultimately, the filling state or the current filling volume depends solely on the current height position or displacement position of the piston-cylinder unit. Further, since the dimensioning of the hydraulic fluid receiving space only changes in the displacement direction but is constant in radial direction relative to the displacement axis, the current filling volume and the current displacement position are thus linearly interrelated. In other words: If the current filling volume of the piston-cylinder unit is known, the current displacement position of the piston-cylinder unit and thus the current lifting position of the lifting column can be calculated. The constants to be used as a basis for such a calculation, such as in particular the geometric configuration of the reference fluid receiving space as a function of a current lifting position of the piston-cylinder unit, can be stored ex works as a corresponding data set. If a volume change in the filling volume of the piston-cylinder unit is now measured and/or monitored starting from a known reference position, the absolute lifting position and/or at least the relative change in the position of the piston-cylinder unit and thus of the lifting column can be determined. For this purpose, according to the invention, a control device is provided which determines the actuation position of the piston-cylinder unit of the pair of traveling devices as a function of the change in volume of the reference fluid determined by the measuring device, displays it via a suitable indicating device and/or controls it. Control in this case means in particular a targeted movement to an absolute lifting position specified by the operator of the construction machine and/or a specified relative change of a current position. The reference fluid thus refers to the fluid used for the measurement and monitoring of the volume change described above. It will be appreciated that there is a suitable signal transmission connection between the measuring device and the control device. The information obtained can also be used to regulate the stroke position of the piston-cylinder unit and thus of the lifting column, for example to mill certain ground profiles and/or to maintain certain lifting states in the event of changing ambient conditions or to counteract them in a regulated manner.

In principle, it is possible to design the measuring device on a measuring piston-cylinder unit separate from the piston-cylinder unit that sets the position of the lifting column or drives its change. For example, the measuring device may be configured similarly to a piston-cylinder unit and may be connected to elements of the lifting column or the piston-cylinder unit that are adjustable relative to each other. If the lifting column is adjusted, the volume of measuring fluid taken up by the measuring piston-cylinder unit changes. For this purpose, a separate tank and a separate connection line may also be provided, from which the measuring piston-cylinder unit is supplied with measuring fluid. One advantage of this arrangement may be that the piston-cylinder unit on which the volume, in particular volume flow, or volume change measurement relevant to the determination described above is performed is virtually pressureless and separate from a hydraulic system used for drive purposes. Such an arrangement is also particularly suitable for retrofitting existing hydraulic systems of generic machines A disadvantage, however, is that in addition to the hydraulic system for driving the lifting adjustment of the lifting column, there must be a separate line system which is used in particular exclusively for measuring purposes. It is therefore also advantageous if the reference fluid used for measuring and monitoring the volume change is also the working hydraulic fluid adjusting the position of the piston-cylinder unit. In other words, the inflow and outflow of the working hydraulic fluid to the piston-cylinder unit of the lifting column is thus measured, which applies the energy required for the lifting adjustment of the lifting column. According to the invention, the measuring device is then configured such that it measures and monitors the volume of working hydraulic fluid supplied to the piston-cylinder unit for adjustment and/or discharged from the piston-cylinder unit for lifting adjustment. The advantage of this preferred embodiment of the invention is that the already existing hydraulic system can be used to determine or measure and monitor the change in volume, and that the hydraulic fluid responsible for adjusting the lifting column is also used to measure and monitor the change in volume. In this case, the working fluid and the reference fluid are thus one and the same fluid.

Preferably, each of the traveling devices is connected to the machine frame via a respective lifting column with a piston-cylinder unit, each piston-cylinder unit being assigned a measuring device. Further, the control device should control each of the piston-cylinder units separately. In this manner, the machine frame can be positioned relative to the underlying ground in a wide variety of relative positions. Of course, two or more lifting columns may be controlled and/or adjusted simultaneously.

For the actual control of the adjustment of a lifting position of the respective lifting column, the control device preferably controls one or more suitable valves which allow or block the inflow and/or outflow of the working hydraulic fluid to the piston-cylinder unit and/or away from the piston-cylinder unit. Such valves are known per se in the prior art.

To specifically supply the lifting columns with working hydraulic fluid, the construction machine preferably comprises a hydraulic fluid supply system with a hydraulic pump. Further, a piston-cylinder unit is preferably provided for each of the lifting columns In addition, there are preferably valves for the working hydraulic fluid inflow and outflow that can be controlled independently of each other by the control unit for each lifting column. In this overall package, each hydraulic cylinder also preferably has a respective measuring device for determining the volume of working hydraulic fluid supplied to the piston-cylinder unit for adjustment and/or discharged from the piston-cylinder unit for lifting adjustment. With this arrangement, any existing lifting column can be adjusted. In addition, each of the provided lifting columns can be adjusted separately and individually. The control unit may also control pairs of lifting columns, for example on one side, at the front or rear, or crosswise together or in opposite directions.

Generally, it is also possible for at least two of the lifting columns to be positively coupled to one another and to form a kind of hydraulic swing axle together. In this case, a common measuring device may be provided which determines and monitors the inflow and outflow of the reference fluid jointly to both of the lifting columns.

The measuring device has the task of determining the volume inflow and outflow to the lifting column when the lifting position of the lifting column is adjusted. This is done in particular in a time-dependent manner, so that all in all a volume flow is determined as the measured variable.

With regard to the specific configuration of the measuring device, a large number of alternative measuring devices may be used. It is possible, for example, to use indirect measuring devices, i.e. measuring devices that do not come into direct contact with the reference fluid, and/or direct measuring devices, in particular those that comprise elements mechanically moved by the volume flow of the reference volume. A significant advantage of indirect measuring devices is that some of them can be mounted externally on an existing supply line and are therefore particularly suitable for retrofitting existing construction machines With these sensors, therefore, the line does not have to be cut and the sensor does not have to be inserted into the line. Alternatively, direct measuring devices are also possible and are encompassed by the scope of the invention. Such direct measuring devices are characterized by the fact that they are at least partially in direct contact with the reference fluid and/or have an element driven, in particular mechanically, by the flowing reference fluid. Particularly suitable, for example, for indirect volume flow measurement is an ultrasonic volume flow meter, especially of the Keyence FD-Q model series. Such a sensor measures the time it takes for an ultrasonic signal to travel from one point on the sensor to another point on the sensor. As the flow rate increases, the signal is accelerated, so that less time is required to transmit the signal between the two points. Based on the relationship between time duration and flow velocity, such a sensor calculates the current flow rate, for example. Additionally or alternatively, an electromagnetic flow meter may also be used. Such a sensor generates a magnetic field in the reference hydraulic fluid perpendicular to the flow direction of the fluid. Electrodes of this sensor are in continuous electrical contact with the reference hydraulic fluid. As the reference fluid is flowing, a voltage is measured between the two electrodes which is proportional to the flow velocity and thus the volume flow. Such a sensor is, for example, the sensor type 8041 from Bürkert. Direct measuring sensors may be, in particular, direct volume flow measuring sensors, such as comprising a measuring turbine, an inner rotary-vane sensor, or an oval wheel sensor. Another alternative is a so-called Coriolis mass flow meter (CMF), which may also be used here.

According to a particularly important embodiment of the invention, the piston-cylinder unit comprises a calibration position and/or a calibration device. According to this embodiment, the piston-cylinder unit can thus assume a defined relative position or at least an absolute position which, on the one hand, can be determined independently of the measuring device described above for measuring and monitoring a change of a volume of a reference fluid and, on the other hand, can be used as a reference position for calculating the change of the lifting position based on the measured and monitored volume change. For this purpose, the piston-cylinder unit may, for example, be adjusted to one of its end positions (maximum extended and/or maximum retracted). Reaching such an end position may, for example, be detected mechanically (so-called "bottoming out", or corresponding to a physical end position) or by corresponding end position switches. Such an end position thus provides a reference variable from which a change in the stroke position of the lifting column can now be calculated based on the measured volume changes. Additionally or alternatively, however, it is also possible to provide a position switch which detects and records a fixed and defined specific position of the lifting column between the two end positions, in particular, for example, a relative position in which the milling drum rests on the underlying ground or engages the underlying ground at a shallow depth. The advantage of defining the reference position such that it is "centered" with respect to the maximum actuation travel of the lifting column is that it is ideally traversed several times during operation of the ground milling machine and can thus be used regularly for readjustment of the control device.

The measuring device is preferably positioned as close as possible to the lifting column and in particular as close as possible to the piston-cylinder unit. It is therefore preferred if the measuring device is arranged on the lifting column or even integrated into it. However, it is also possible for the measuring device to be arranged further inside the machine, for example as part of a measuring block or the like.

The invention is particularly suitable for construction machines of the ground milling machine type, i.e. road milling machines, stabilizers, recyclers and surface miners.

Another aspect of the invention consists in a method for controlling the lifting position of a piston-cylinder unit of a lifting column of a construction machine, in particular a construction machine according to the invention. Essential steps of the method according to the invention include measuring and monitoring a change of a volume of a reference fluid, in particular the working hydraulic fluid, which correlates with a current position of the piston-cylinder unit (step a)). An important basic aspect thus is the finding that it is possible to make an indirect statement about the current stroke position of the piston-cylinder unit, or at least about a relative change in the lifting position of the piston-cylinder unit based on a known position, by measuring and monitoring the volume change. Moreover, according to the invention, the actuation position of the piston-cylinder unit is controlled as a function of the change in volume of the reference fluid determined by the measuring device (step b)). The control device, in particular as described above, thus determines, on the one hand, an actual position of the lifting position of the piston-cylinder unit depending on an actual volume change and controls the further adjustment of the piston-cylinder unit until a desired position is reached. The control variable is in this case the monitored volume change of the reference fluid. In this manner, a sufficiently precise determination and/or monitoring of the adjustment of the lifting position of the piston-cylinder unit and thus of the entire lifting column is achieved with relatively simple means.

The volume change is preferably measured and monitored as a function of time. In other words, according to the invention, the volume flow is thus measured.

To carry out the method according to the invention as precisely as possible, it is further preferred if the lifting position determined via the volume change is calibrated with respect to at least one defined lifting position before and/or during steps a) and b).

BRIEF DESCRIPTION OF THE DRAWINGS

The invention will be explained in more detail below by reference to the embodiment examples indicated in the figures. In the schematic figures:

FIG. 3 is a schematic and highly simplified view of the machine frame, including traveling devices and lifting columns, of the construction machine of FIGS. 1 and 2;

FIG. 4 is a longitudinal cross-sectional view through a lifting column (FIG. 4*a*) and an illustration of different operating states (FIGS. 4*b* and 4*c*);

DETAILED DESCRIPTION

In the figures, like components are designated by like reference numbers, although not every repeating component is marked separately in the figures.

Figure 1:
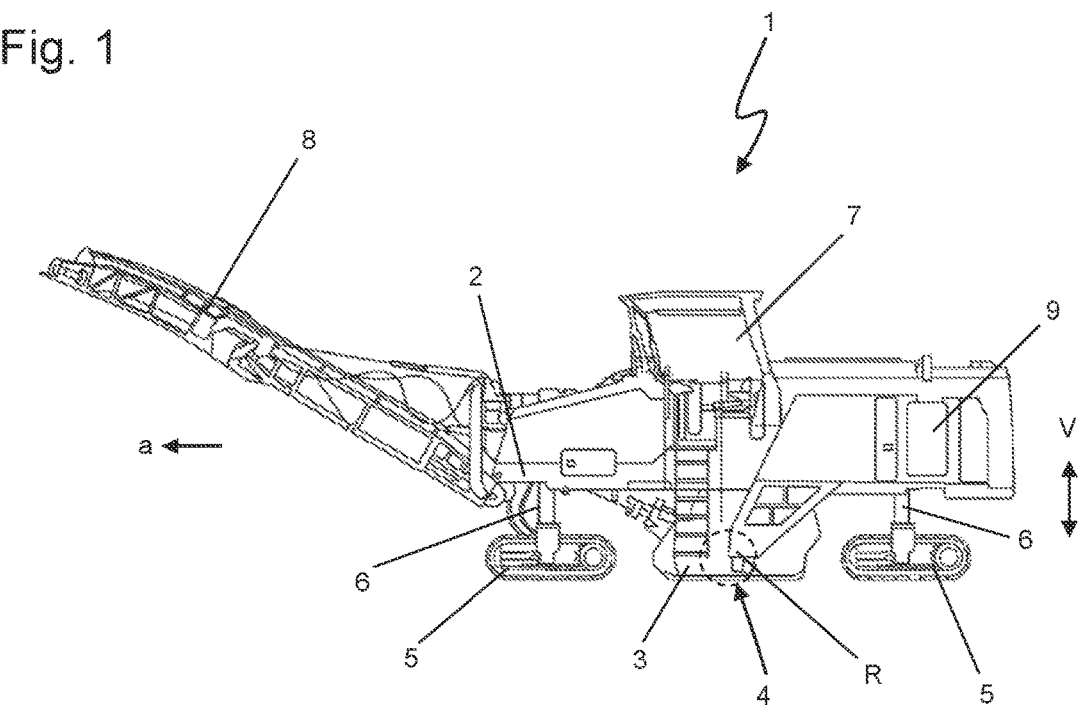
FIG. 1 is a side view of a construction machine, specifically a ground milling machine of the road cold milling machine type.

FIG. 1 illustrates a generic construction machine, more specifically a ground milling machine 1 of the road cold milling machine type. The following information also applies to stabilizer, recycler and surface miner type ground milling machines.

Essential elements of the road milling machine 1 are a machine frame 2, a milling drum 4 (indicated by dashed lines) arranged in a milling drum box 3, traveling devices 5, in this case crawler tracks, connected to the machine frame 2 via lifting columns 6 and supporting the road milling machine 1, an operator platform 7, a front loading conveyor 8 and a drive device 9. In working operation, the self-propelled ground milling machine 1 travels in working direction a over the underlying ground to be milled, with the milling drum 4 rotating about a rotation axis R running horizontally and transversely to the working direction and engaging the underlying ground, thereby milling it with milling tools not described in more detail in a manner known per se in the prior art.

Figure 2:
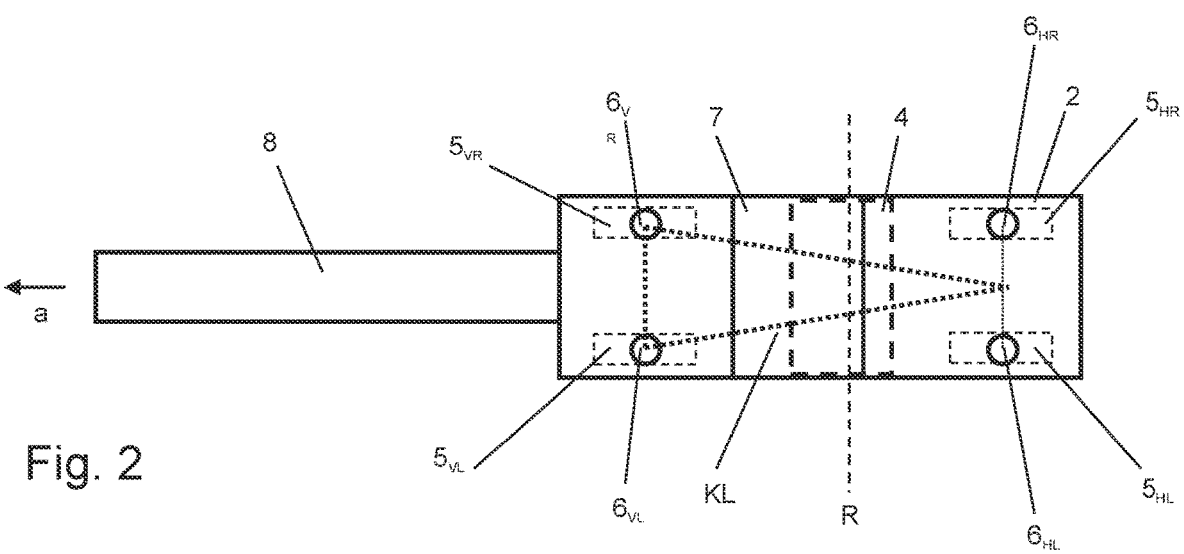
FIG. 2 is a top view of the construction machine of FIG. 1.

FIG. 2 illustrates the basic structure of the ground milling machine 1 in a schematic top view. Accordingly, in total, the ground milling machine 1 comprises a pair of front traveling devices 5VR and 5VL, each of which is connected to the machine frame 2 via one of the lifting columns 6VR or 6VL. There is also a pair of rear traveling devices 5HR and 5HL, which are connected to the machine frame via lifting columns 6HR and 6HL. "H" and "V" in this case denote the arrangement in the forward direction a of the ground milling machine 1 and stand for "rear" ("hinten") and "front" ("vorne"), while "R" and "L" denote the side of the ground milling machine 1 as seen in the forward direction and stand for "right" and "left".

During working operation of the ground milling machine 1, two basic challenges arise for the machine operator with regard to the position of the ground milling machine 1. On the one hand, it is desirable to mill the underlying ground at a specified and controlled milling depth, for example, to ensure sufficient surface removal while avoiding damaging deeper layers of the roadbed. On the other hand, due to their high center of gravity, such ground milling machines tend to tip over comparatively quickly, especially when running over ground obstacles such as milling edges. In order to increase the tip stability of these ground milling machines 1, a so-called "swing mechanism" may therefore be provided, which in the sense of a swing axle provides for counter-directional height compensation of the pair of front traveling devices 5VR and 5VL and/or rear traveling devices 5HR and 5HL and/or left traveling devices 5VL and 5HL and/or right traveling devices 5VR and 5HR and thereby at least partially compensates for ground unevenness towards the machine frame 2. For this purpose, the lifting columns 6 are configured to be height-adjustable in the vertical direction V or movable in vertical direction.

For this purpose, each lifting column 6 comprises a piston-cylinder unit 10 configured as a double-acting hydraulic cylinder, the structure and mode of operation of which are shown in more detail in FIGS. 4a to 4c. As will be described further below, the present system allows all lifting columns 6 to be controlled independently of each other. Additionally, however, the lifting columns may be controlled in dependence on each other, for example in pairs. For example, it is also possible to implement a virtual swing axle, as illustrated, for example, for the two rear lifting columns 6HL and 6HR in FIG. 2. In this manner, the resulting tipover lines of a 3-fold swing mechanism, which indicate the boundary for the machine center of gravity in the horizontal plane for a stable machine position, can also be quickly converted to, for example, a 4-fold swing mechanism by adapting the control accordingly.

It is known and also possible within the scope of the present invention, in particular for smaller milling machines, especially so-called rear-rotor milling machines, to provide only a single, non-height-adjustable wheel or pair of wheels with a mechanical swing axle at the front. On these machines, only the rear traveling devices are connected to the machine frame via lifting columns in a height-adjustable manner.

FIG. 3 illustrates the basic mode of operation of the overall traveling mechanism of the ground milling machine 1. The machine frame 2 is indicated by dashed lines in a machine frame plane ME lying in the horizontal plane, which in the present example runs parallel to the horizontal ground. Drive device 9 is provided to drive the height adjustment, and may be, for example, an internal combustion engine that drives a hydraulic pump of a corresponding hydraulic supply system. Via corresponding hydraulic lines 17 (dash-dotted lines), the drive device 9 is in fluid communication with each of the actuators, configured as piston-cylinder units 10, of the lifting columns 6

The actuating movement of the piston-cylinder units 10 and thus of the lifting columns 6 is coordinated by a control device 18, which is connected to measuring devices 19. In the present case, each of the measuring devices 19 is a sensor, for example an ultrasonic flow sensor or an impeller cell sensor, which measures and monitors the hydraulic fluid flowing to and/or from the respective piston-cylinder unit 10 and transmits it to the control device 18. The measuring devices 19 can thus be used to detect a volume change of hydraulic fluid within the piston-cylinder units 10 which is representative of a relative adjustment of the respective piston-cylinder units 10 and thus of the respective lifting columns with respect to a defined starting position. If such a measuring device 19 is assigned to each of the four traveling devices, the current position of the entire machine frame or the lifting position of all lifting columns can thus be determined and monitored. The individual measuring devices 19 are connected to the control device 18 via signal lines indicated by dotted lines in FIG. 3. The control device 18 is further connected to the drive device 9 via line P for transmitting control signals. It is further important according to the invention that the control device 18 preferably controls the piston-cylinder units 10 in respective pairs at least during traveling operation, so that, for example, an actuating movement of lifting column 6VL also triggers an actuating movement of lifting column 6VR but not necessarily an actuating movement of lifting columns 6HL or 6HR. Additionally or alternatively, the pairing may also be provided between lifting columns 6VL and 6HL and/or 6VR and 6HR. The control device 18 further controls each of the piston-cylinder units 10 individually and independently. This means that even for paired control, the control device 18 controls both lifting columns 6 or piston-cylinder units 10 of a pair independently of one another.

The basic structure of possible lifting columns is shown by way of example in FIGS. 4a to 4c for further clarification. FIG. 4 is a longitudinal cross-sectional view through a lifting column 6 in vertical direction along its central longitudinal axis. The essential element of each lifting column 6 is, in particular, a piston-cylinder unit 10, via which the adjusting force is applied. In this particular embodiment example, the piston-cylinder unit 10 is a hydraulic cylinder-piston unit with a hydraulic cylinder 11 and a piston 12 guided in the hydraulic cylinder 11 in a linearly displaceable manner. The piston-cylinder unit 10 is shielded from the outside in a known manner by a pair of sleeves 16a, 16b for protection from external influences and for stable longitudinal guidance.

FIGS. 4b and 4c schematically indicate the mode of operation of the piston-cylinder units 10 in more detail, with FIG. 4b relating to the low position or the maximum contracted state and FIG. 4c relating to the high position or the maximum extended state of the lifting column 6 or the piston-cylinder unit 10. FIGS. 4b and 4c relate to a reversed arrangement of cylinder 11 and piston 12. Two inlets and outlets 13a and 13b are provided in the hydraulic cylinder 11, through which hydraulic fluid can be supplied to or discharged from the piston-side interior space 14 (cylindrical interior space) or the rod-side interior space 15 (annular interior space), as indicated by the corresponding arrows. In the present case, the cylinders are thus so-called double-acting working cylinders. The actuating movement of the piston 12 inside the cylinder 11 within the maximum actuation range causes the interior spaces 14 and 15 to vary in volume with regard to their extension exclusively in the axial direction or in the direction of the actuating movement or relative adjustment between piston 12 and cylinder 11.

In particular, FIG. 4c further illustrates that the flow sensor 19 of the measuring device 19 preferably measures and monitors the inflow and outflow of hydraulic fluid to the piston-side interior space 14 and/or the rod-side interior space 15. Both interior spaces 12 and 15 may be monitored, although it is also possible to monitor only one interior space. The measuring devices 19 are therefore preferably arranged directly on the lifting column, very particularly directly on the piston-cylinder unit 10 and in particular directly in the inlet and/or outlet 13a/b of the lifting column.

A defined reference position may be approached for calibration. For this purpose, for example, a contact switch may detect one of the two end positions, as shown in FIGS. 4b and 4c. FIG. 4b shows such a contact switch 20, which is triggered when the piston-cylinder unit 10 is in the lower end position (i.e. maximally retracted) shown in FIG. 4b. The contact switch 20 is also in signal communication (not shown) with the control device 18 for this purpose.

Additionally or alternatively, a position sensor 21 may be provided that specifically signals when a position between the two end positions of FIGS. 4b and 4c is reached, for example when the piston passes the position sensor 21 arranged on the cylinder side. This can be advantageously exploited in that, ideally, this calibration position is traversed several times during operation. Position sensor 21 is also in signal communication (not shown) with control device 18.

Figure 5:
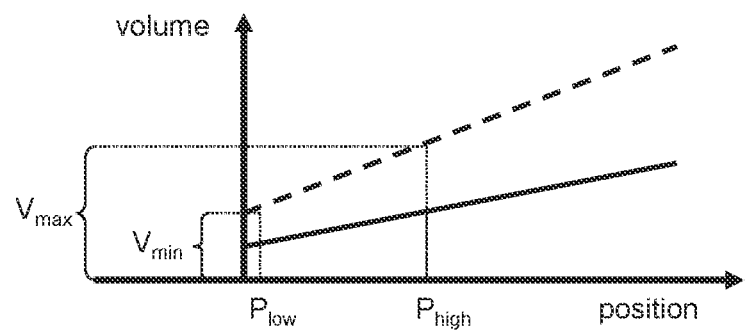
FIG. 5 is a diagram showing the correlation between the current stroke position P of the piston-cylinder unit 10 and the volume change.

FIG. 5 illustrates the correlation between the current stroke position P of the piston-cylinder unit 10 and the volume change. The solid line indicates the progression of the stroke position ("position") of a lifting column as a function of the total volume of hydraulic fluid ("volume") contained in the lifting column. The dashed line, on the other hand, indicates a change in volume with respect to a reference receiving space as a function of the stroke position. FIG. 5 shows that the volume changes proportionally to the stroke position. The diagram explicitly shows the maximum extended position $P_{high}$ with the volume $V_{max}$. If the piston-cylinder unit 10 is retracted from this known end position (detected, for example, by sensor 20), hydraulic fluid flows out of the piston-cylinder unit 10 in a quantity proportional to the current lifting position. This is detected with the aid of the measuring device 19. At $P_{low}$, the piston-cylinder unit 10 is in its lower end position. Until that point, the differential volume $V_{max}$-$V_{min}$ has been discharged from the monitored hydraulic fluid receiving space of the piston-cylinder unit 10 and detected by the measuring device. The same applies in reverse, of course. Overall, it is therefore possible, with the aid of the detection of the quantity of hydraulic fluid flowing to the piston-cylinder unit 10 and/or discharged from the piston-cylinder unit 10, to determine a relative change in the lifting position and, if the reference position of the piston-cylinder unit 10 is known, also its absolute stroke position with the aid of the control device 18 and to use this for control and regulation purposes. This makes it possible to display the currently determined lifting states of the lifting columns to the operator for easier operation. Additionally or alternatively, the determined lifting states may also be used for controlled movement to desired lifting positions of the lifting columns.

Figure 6:
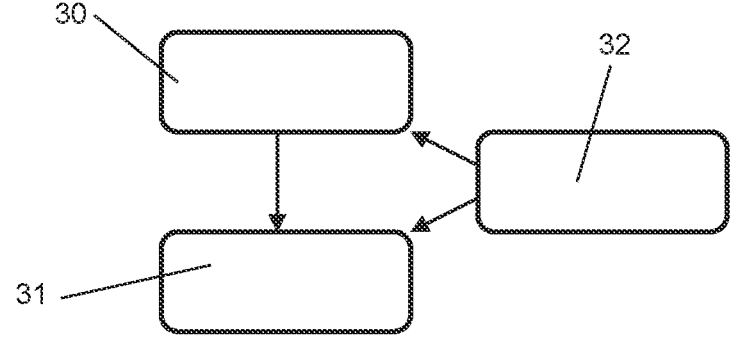
FIG. 6 is a flow chart for a method according to the invention.

FIG. 6 illustrates by way of example the sequence of a method according to the invention. First, step 30 comprises measuring and monitoring of a volume change of a volume of a reference fluid which correlates with a current lifting position of the piston-cylinder unit, for example as already discussed in FIG. 5. This correlation is then used in step 31 to control the actuating position of the piston-cylinder unit (10) as a function of the volume change of the reference fluid determined by the measuring device (19). Step 32 comprises calibrating the lifting position determined via the volume change with respect to at least one defined lifting position before and/or during steps 30 and 31.

What is claimed is:

1. A construction machine, comprising:
   a machine frame;
   a traveling mechanism with front and rear traveling devices with at least one pair of front traveling devices and/or a pair of rear traveling devices, at least one pair of the front or rear traveling devices being connected to the machine frame via lifting columns each having a respective hydraulically adjustable piston-cylinder unit;
   a drive device for driving the hydraulically adjustable piston-cylinder unit of the lifting columns separately from one another;
   a control device configured to control the lifting adjustment of the lifting columns by the hydraulically adjustable piston-cylinder units;
   wherein at least one piston-cylinder unit of a pair of the front or rear or right or left traveling devices is assigned a measuring device which is configured to measure and monitor a volume change of a volume of a reference fluid which correlates with the current lifting position of the piston-cylinder unit, and that the control device controls the actuating position of the piston- cylinder unit of the pair of traveling devices as a function of the volume change of the reference fluid determined by the measuring device; and
   wherein the measuring device is arranged on a measuring piston-cylinder unit separate from the piston-cylinder unit that sets the position of the lifting column or drives its change.

2. The construction machine according to claim 1, wherein the reference fluid is the working hydraulic fluid which adjusts the position of the piston-cylinder unit, and that the measuring device is configured such that it measures and monitors the volume of working hydraulic fluid which is supplied to the piston-cylinder unit for lifting adjustment and/or is discharged from the piston-cylinder unit for lifting adjustment.

3. The construction machine according to claim 1, wherein each of the driving devices is connected to the machine frame via a respective lifting column with a piston-cylinder unit, that each piston-cylinder unit is assigned a measuring device, and that the control device controls each of the piston-cylinder units separately.

4. The construction machine according to claim 1, wherein a hydraulic supply system with a hydraulic pump is provided, that each of the lifting columns has a piston-cylinder unit, that valves that can be controlled independently of one another by the control device are provided for each lifting column for working hydraulic fluid inflow and outflow, and that each hydraulic cylinder is provided with a respective measuring device for determining the volume of working hydraulic fluid supplied to the piston-cylinder unit for lifting adjustment and/or discharged from the piston-cylinder unit for lifting adjustment.

5. The construction machine according to claim 1, wherein the measuring device is a flow measuring sensor.

6. The construction machine according to claim 1, wherein the piston-cylinder unit comprises a calibration position and/or a calibration device.

7. The construction machine according to claim 1, wherein the measuring device is arranged on or integrated into the lifting column.

8. A method for controlling the lifting position of a piston-cylinder unit of a lifting column of the construction machine according to claim 1, comprising the steps of:

a) measuring and monitoring a volume change of a volume of a reference fluid which correlates with a current lifting position of the piston-cylinder unit; and
b) controlling the actuation position of the piston-cylinder unit as a function of the volume change of the reference fluid determined by the measuring device.

9. The method according to claim 8, wherein the measuring and monitoring of the volume are performed in a time-dependent manner.

10. The method according to claim 8, wherein before and/or during steps a) and b), a step of calibrating of the lifting position determined via the volume change is carried out with respect to at least one defined lifting position.

11. The construction machine according to claim 1, wherein the construction machine is a road milling machine.

12. The construction machine according to claim 5, wherein the measuring device is a flow measuring device.

13. The construction machine according to claim 12, wherein the flow measuring device is a volume flow measuring device.

14. The construction machine according to claim 13, wherein the volume flow measuring device is an indirect volume flow measuring device.

15. The construction machine according to claim 13, wherein the volume flow measuring device is an ultrasonic volume flow sensor.

16. The construction machine according to claim 13, wherein the volume flow measuring device is a direct volume flow measuring device.

17. The construction machine according to claim 13, wherein the volume flow measuring device comprises a measuring turbine, impeller, or oval wheel sensor.

* * * * *